United States Patent

[11] 3,547,016

| [72] | Inventor | Waldemar T. Rentschler<br>Calmbach, Germany |
|---|---|---|
| [21] | Appl. No. | 588,070 |
| [22] | Filed | Oct. 20, 1966 |
| [45] | Patented | Dec. 15, 1970 |
| [73] | Assignee | Prontor-Werk Alfred Gauthier G.m.b.H.<br>Calmbach Black Forest, Germany<br>a corporation of Germany |
| [32] | Priority | Oct. 23, 1965 |
| [33] | | Germany |
| [31] | | No. P37,945 |

[54] PHOTOGRAPHIC CAMERA HAVING A TIMING DEVICE OPERATING ELECTRONICALLY AND CONTROLLED BY A PHOTOELECTRIC DEVICE
12 Claims, 8 Drawing Figs.

[52] U.S. Cl. .......... 95/10, 95/53, 95/64
[51] Int. Cl. .......... G03b 7/08, G03b 7/12
[50] Field of Search .......... 95/10C, 64, 53, 63

[56] References Cited
UNITED STATES PATENTS

| 2,978,970 | 4/1961 | Fahlenberg | 95/10(C)X |
| 3,026,783 | 3/1962 | Winkler | 95/10(C) |
| 3,063,354 | 11/1962 | Matulik et al. | 95/10(C) |
| 3,194,136 | 7/1965 | Ort | 95/10(C) |
| 3,292,516 | 12/1966 | Sato et al. | 95/10(C) |
| 3,286,610 | 11/1966 | Fahlenberg | 95/10(C) |

*Primary Examiner*—Norton Ansher
*Assistant Examiner*—Joseph F. Peters, Jr.
*Attorney*—Amster & Rothstein ABSTRACT: A photographic camera is constructed with an electronic exposure timing circuit controlled by a photoelectric device which sets a moving coil meter, the pointer of which is clamped and then scanned upon actuation of the camera release to determine the appropriate lens aperture and to actuate a further device which controls the timing of the electronic circuit. The meter is preferably provided with an indicating scale visible to the camera user and a timing device which may include a diaphragm located in front of a photoelectric resistor so as to affect the timing of the electronic circuit.

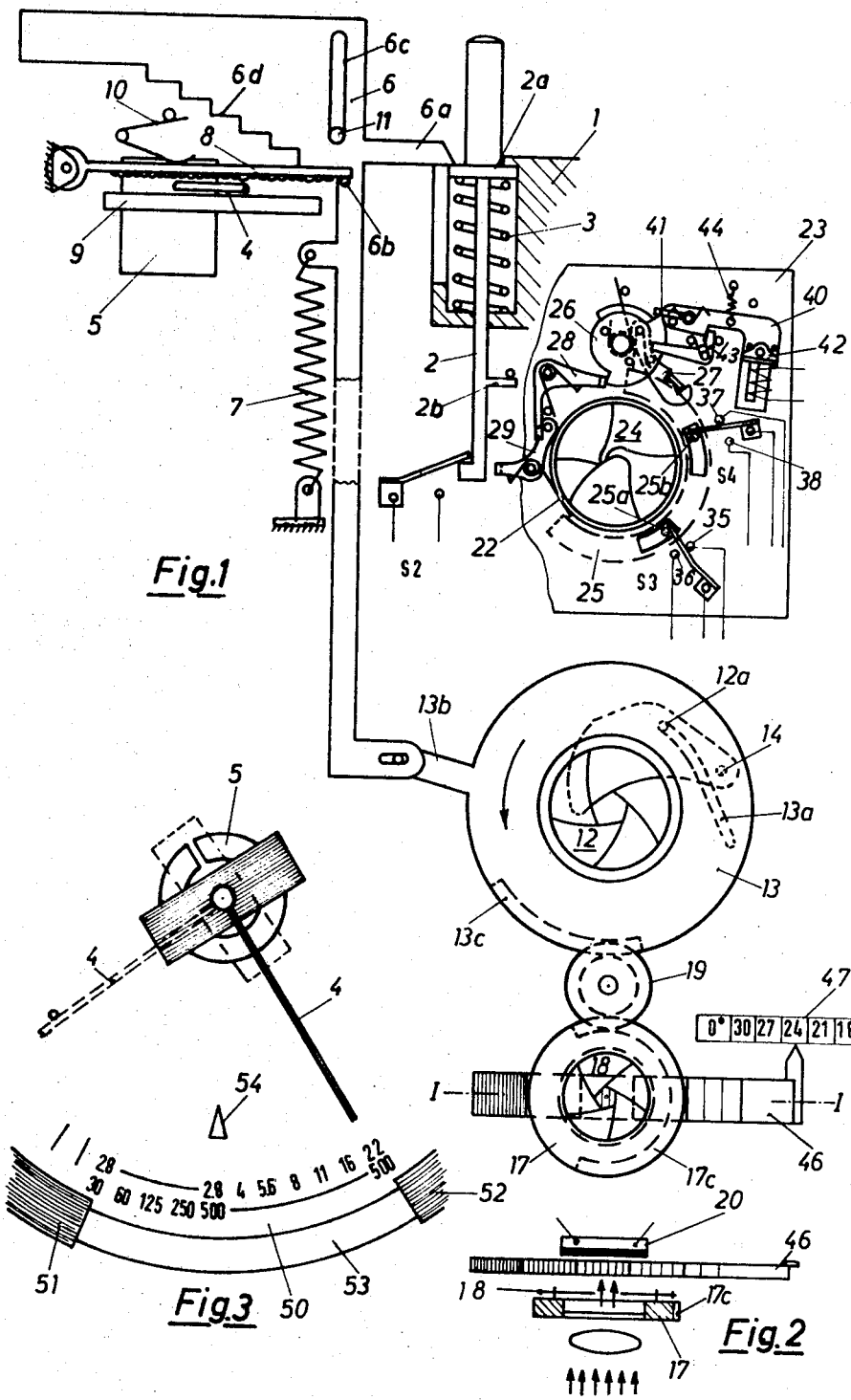

INVENTOR.
WALDEMAR T. RENTSCHLER
BY
Anster & Rothstein
ATTORNEYS

PHOTOGRAPHIC CAMERA HAVING A TIMING DEVICE OPERATING ELECTRONICALLY AND CONTROLLED BY A PHOTOELECTRIC DEVICE

The invention concerns a photographic camera having a timing device operating electronically and controlled by a photoelectric device.

In cameras having a coupled exposure meter three embodiments in all are now known having the characteristic features of exposure setting listed below:

(a) time preselection with automatic aperture setting;
(b) aperture preselection with automatic timing;
(c) time - aperture automatic programme.

In these cases the term "automatic" means that in cases (a) and (b) the factors "aperture" or "time" respectively, and in the case (c) time and aperture, are automatically and mutually adjusted, or alternatively determined in accordance with a fixed predetermined programme. In these cameras an indication is given on the camera exterior or in the view finder with reference to a scale or red and green strips as to whether the values for aperture and/or exposure time lie within a certain allowable region. This applies both to the operating range of the aperture associated with the particular camera, and more especially the resulting exposure time which, for hand-held exposures, should be no longer than one-thirtieth sec.

In so-called electronic cameras, i.e. cameras in which the exposure setting is effected by means of an electronic circuit, the above-mentioned methods (a) and (c) are not readily realisable, since an electronic system, by virtue of its method of operation, is mainly suitable for determining time intervals; either a preselected aperture or a fixed aperture is used. Electronic conversion of a light value into an aperture area was previously possible only in arrangements which were considerably more costly than those means usually provided in cameras with a coupled moving coil exposure meter. Consequently hitherto known embodiments of so-called "electronic cameras" have preferably been restricted exclusively to the above method of application (bThus an exposure time has been determined depending on the preset aperture, the film speed and the prevailing lighting conditions, by means of a photoelectric resistor and an electronic circuit connected thereto. A problem however in this case involves the indication of the exposure time thus determined. Hitherto it was necessary for an additional device to be used apart from the electronic circuit determining the duration of exposure, for example a moving coil meter or an electronically controlled light indication. These additional arrangements only serve the one purpose of imparting to the user the information concerning the exposure time to be expected, whilst functionally they contributed nothing to exposure time determination or setting.

The object of the present invention consists in the improvement of known electronic cameras with a minimum of structural additions, to provide a time-aperture-programme automatic system which also tells the person taking photographs simultaneously and at any time whether the exposure time determined is within the "hand-held region" or not.

This problem is solved in accordance with the invention by a photographic camera having an electronic circuit for exposure timing controlled by a photoelectric device, in which the photoelectric device sets a moving coil meter, the pointer of which, after clamping, is scanned upon actuation of the camera release, the scanning movement determining the lens aperture and actuating a further device which affects the timing of the electronic circuit. The advantage of this arrangement is that the moving coil meter is adapted to be combined with the electronic circuit not only for the purpose of battery test and to indicate the obtainable exposure values, but also serves the further purpose that the moving coil pointer position is employed for codetermining both the diaphragm setting and the shutter speed. Hence in a manner not known heretofore and with little addition of components a programme camera operating on an electronic basis is realized which combines the hitherto known advantages of the "moving coil measuring mechanism automatic system" of aperture setting with the advantages of an electronic circuit for exposure timing, and possessing high constancy of function and a wide exposure time range (1/500 sec. to 30 sec.).

The demands usually made upon the release mechanism of a camera with regard to the shutter release movement (as short as possible) and release pressure (as low as possible) may be best taken into account in a camera in accordance with the invention by the use of a diaphragm (or wedge) displaceable with the lens diaphragm and located in front of a photoelectric resistor, as a device for affecting the timing of the electronic circuit in dependence upon the aperture. Alternatively this construction may be replaced by a device actuable with the lens aperture setting and serving to set the threshold of the electronic circuit timing device.

In order to permit film material of different speeds to be used in a camera having the above features, the invention provides an additional device serving to take into account the different film speeds and acting to set the timing of the electronic circuit. For this purpose a grey wedge (or diaphragm) in front of the photoelectric device may be used. This may be replaced in accordance with the invention by any suitable alternative device which also sets the threshold of the electronic circuit timing.

In another aspect of our invention the scanning mechanism for the meter pointer has a control member adapted to cooperate therewith which is provided with a scanning cam extending over a portion of the movement region of the pointer, the length of which cam corresponds to the sum of the aperture scale and the exposure time scale lengths, from the shortest possible time to a limit exposure time, e.g. one-thirtieth sec., and that the characteristic of the cam is derived from a preselected exposure time-aperture programme.

According to a further feature of the invention a switch is provided by means of which the photoelectric device in the form of a photoelectric resistor is disconnected from the meter and connected to the electronic circuit in dependence upon the actuation of the sector ring or the camera release. Moreover a manually actuable switch may be arranged in the circuit of the battery, whereby the person taking photographs may check the voltage of the battery at any time to ensure that the exposure setting remains accurate.

To prevent faulty exposures due to lack or excess of lighting of the object when taking photographs, in accordance with a further feature of the invention an indicator is associated with the meter pointer which gives information concerning the prevailing lighting conditions or shows the aperture and time values effective during exposure. A still greater degree of reliability of the camera in accordance with the invention may be obtained by providing the moving coil meter and the electronic circuit each with its own battery.

Details of the invention will be seen from the description below and the accompanying drawings in which:

FIG. 1 is a partial diagrammatic view of an electronically controlled lens shutter mechanism with which is associated an aperture determining mechanism according to our invention;

FIG. 2 is a cross section through the arrangement (photoelectric resistor, grey wedge, aperture) along the sectional line I–I of FIG. 2;

FIG. 3 is a plan view of the moving coil meter and the exposure indicator scale associated therewith;

Figure 4:
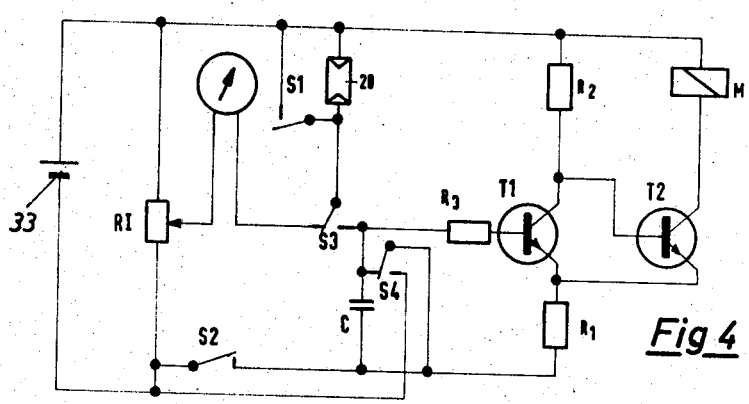
FIG. 4 is the schematic of an electronic circuit arrangement which includes a moving coil meter, in which a single battery is used for both the meter and the shutter timing electromagnet.

In FIG. 1, the numeral 1 is the camera housing which is only indicated on the drawing, with a release plunger 2 serving to release the camera shutter; it is displaced against the action of a return spring 3. Cooperating with the release plunger 2 is a scanning mechanism, indicated schematically, which scans a pointer 4 of a moving coil meter 5 incorporated in the camera and in accordance with the cam movement permitted by the pointer, sets the lens aperture of the camera mechanically to the required aperture value. For this purpose the scanning mechanism has a scanning slider 6 which by means of an extension 6a is kept in contact with a collar 2a of the release plunger 2 by the action of a spring 7. Associated with the moving coil meter is a clamp 8 rotatably pivoted at one end, supported against a pin 6b of the scanning slider 6, and cooperating with a fixed supporting ledge 9. The arrangement is such that the clamp comes instantly into action by means of the spring 10 when the scanning slider 6 leaves its rest position and arrests the pointer 4 in the position in which it is at that time.

Whilst the scanning slider 6 is guided in a straight line at one end along a fixed pin 11 by means of a slot 6c, the slider is in operational engagement at its other end with a setting member 13 adapted to vary the position of the blades 12 of the lens diaphragm. The member 13 has several slant control slots 13a — (the drawing shows only one) — and a radially outwardly directed arm 13b which is in pin-and-slot engagement with the lower end of the scanning slider 6. In order to ensure that the blades 12 maintain their original position (f 22), in the first phase of movement of the scanning slider 6, up to the time at which the pointer 4 is firmly clamped, a short section is provided on each of the control slots 13a extending concentrically relative to the lens aperture. A pin 12a secured to the blade 12 engages in such a manner in the slot 13a of the aperture setting member 13 that the blades, which are rotatably mounted on pins 14, swing out from the smallest aperture to a larger aperture when the setting member is rotated in the direction of the arrow shown in FIG. 1.

The scanning mechanism decides the degree of swing-out motion (aperture opening) the stroke of which in turn is determined by the pointer position corresponding to the lighting condition. Preferably a battery is used for energizing the moving coil meter, and a photoelectric resistor varied by lighting conditions is provided connected in the circuit of the battery. The resistance of such a device varies inversely with the intensity of light falling on it.

The lens aperture mechanism controlled by means of the scanning mechanism in dependence upon the lighting has associated therewith a further diaphragm mechanism acting on the photoelectric resistor referred to above and set to a position corresponding to the lens aperture. This diaphragm comprises a setting ring 17 and a plurality of blades 18. To permit the setting ring 17 to be displaced simultaneously with the aperture setting member 13 a fixedly mounted pinion 19 is provided which is in engagement with toothed sections 13c and 17c provided on the circumference of the setting members. Both aperture mechanisms are arranged so that they have the smallest aperture in the rest position of the scanning procedure and are so moved that the blades 12 and 18 after an initial delay, open progressively. This in turn results in that with the increase of the lens aperture, the photoelectric resistor 20 behind the diaphragm 17 is subjected to increasing light and hence progressively lowers its resistance.

Cooperating with the above-described aperture mechanism is a mechanical shutter arrangement also shown in FIG. 1, which is equipped with an electronic device for exposure timing, this being controlled by the photoelectric resistor 20. For clarity's sake FIG. 1 shows the lens aperture offset relative to the shutter, as indicated by the dotted portion of the scanning slider 6. In actuality the light passage aperture 22 of the base plate 23 of the shutter is coaxial with the passage of the aperture setting member (diaphragm) 13. Concerning the shutter arrangement, FIG. 1 shows that the blades 24 are moved by means of a crank drive engaging a ring 25. To maintain the crank drive, which comprises a spring-operated driving disc 26 and a driving pawl 27, which is in positive engagement with the sector ring 25, in a cocked state, a pivoted stop lever 28 is provided which at one end cooperates with a projection of the driving disc 26 and at the other end with a release lever 29 which is actuated by a driver 2b on the release plunger 2.

As already explained above, the setting of the lens aperture is effected by means of the scanning mechanism associated with the moving coil meter 5 and the plunger 2 when the camera release is operated, whilst the exposure time is determined subsequently by the electronic device controlled by the photoelectric resistor 20. Both the moving coil meter and the electronic circuit providing the timing are supplied with current by a single battery 33 shown in the schematic in FIG. 4. The circuit arrangement is such that at the commencement of the release motion, the moving coil meter 5 and the photoelectric resistor are simultaneously connected to the battery. The result of this is that pointer 4 of the moving coil measuring mechanism swings out from its rest position indicated in chain-dotted lines in FIG. 3 to a setting position corresponding to the lighting conditions, as also shown in FIG. 3 in full lines.

Connected in the circuit of the battery 33 is a switch $S_2$ actuated by the release plunger 2, the object of which is to connect the electromagnet M, cooperating with the shutter drive, to the battery immediately after the pointer has been clamped, and before the end of the scanning operation. A further switch $S_3$ is provided for the purpose of changing over the photoelectric resistor 20 after scanning from the moving coil meter 5 to the electronic circuit serving the timing, and described in detail hereinafter. For this purpose it is expedient to use the sector ring 25, and the latter carries a pin 25a which causes the contact tongue of switch $S_3$, in the rest position of the ring, to be supported against a contact pin 35 electrically connected to the moving coil measuring mechanism. When the sector ring 25 leaves the rest position, the tongue of switch $S_3$, following pin 25a, stops against a contact pin 36 which is electrically connected with the electronic circuit. This timing device, which comes into operation on releasing the shutter, is a relaxation circuit and for this purpose is provided with two transistors $T_1$ and $T_2$, and a capacitor C. There is also a variable resistor $R_1$ serving to determine a threshold or timing value, a series resistor $R_2$ and a further resistor $R_3$. Also connected in the circuit is the electromagnet M which serves to lock the shutter drive temporarily. Finally the circuit contains a switch $S_4$ which is a charge starting switch. This switch is so arranged with reference to a pin 25b that the switching tongue in the rest position of the ring 25 is retained against the contact pin 37 and when the ring moves, strikes against the contact pin 38. This switching procedure of switch $S_4$, which takes place simultaneously with $S_2$, initiates charging the capacitor C, and applies battery potential to the circuit even is switch $S_2$ is opened before the end of the shutter function. When the capacitor C has been charged via the photoelectric resistor 20 to the threshold value of the circuit, transistor $T_1$ becomes conductive and transistor $T_2$ is blocked. Since no current then passes through the electromagnet M, this magnet is deenergized and the locking mechanism retaining the shutter blades in the open position, is released.

This locking mechanism, as shown in FIG. 1, is an armature lever 40 mounted on a fixed pin and supporting at one end a spring strap 41, and at the other end an armature 42 associated with the electromagnet M. The armature lever 40 cooperates with a catch lever 43 bent at an angle, against one lever arm of which the stop flap 26a of the driving disc 26 strikes and thereby becomes locked. In the cocked position of the shutter as shown in FIG. 1 the armature is held against the electromagnet M due to the cooperation of the driving disc 26 and armature lever 40, against the action of a return spring 44. The armature lever keeps this position under the influence of the magnet M during the delay action of the electronic timing device, whereby the sector ring 25 is locked in the open position of the shutter blades 24. As soon as the electromagnet M is deenergized spring 44 pulls the armature lever 40 back in an anticlockwise direction causing the catch lever 43 to lose its support against the armature lever 40. The result of this is that the driving disc 26 rotates the lever 43 is an anticlockwise direction and consequently continues the shutter movement, i.e. it closes the shutter.

In accordance with the embodiment shown in FIG. 1 the timing of the circuit is varied by the diaphragm 17, 18 displaced simultaneously with the lens aperture 12, 13 and located in front of the photoelectric resistor 20. In order to take the film speed into consideration, it is possible to use a grey filter 46 of stepped density in front of the photoelectric resistor 20, (a grey wedge) and to arrange it displaceably relative to the photoelectric resistor. The setting of the grey wedge is determined by a film speed scale 47. Alternatively the grey wedge could be set by the lens diaphragm 12 and the diaphragm 18 could be set in accordance with a film speed scale.

A further possibility is that a device actuated by the lens diaphragm is provided which varies the threshold value of the electronic circuit. For this purpose, the resistor $R_1$ could be employed, mechanically coupled to the scanning mechanism.

It has already been said that the scanning mechanism has a slider 6 adapted to cooperate with the pointer 4 of the moving coil meter 5 and provided with a scanning cam 6d. The latter preferably extends only over a part of the movement range of the pointer 4. The length of the scanning cam may be so settled, that it corresponds to the sum of the aperture range length and the exposure time scale from the shortest exposure to a limit exposure time of about one-thirtieth sec. As evident from FIG. 6 to 8, the shape of the scanning cam 6d may vary and hence the programme of the pairing of aperture and time values can be varied.

Figure 6:
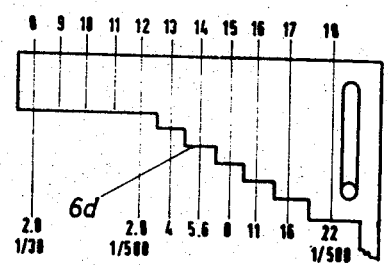
FIG. 6 is an embodiment of a scanning cam for an automatic time-aperture programme.
Figure 7:
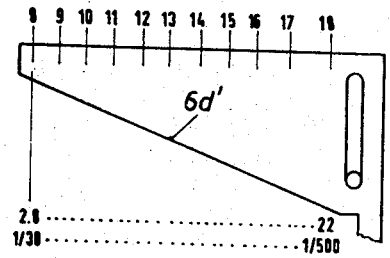
FIG. 7 is an alternative embodiment of a scanning cam having continuously varying aperture values.

According to the embodiment shown in FIG. 6 the steps of the scanning cam 6d give a light value series of 18 to 8 aperture-time in a programme shown below:

| f No. | 22 | 2.8 | 2.8 | |
|---|---|---|---|---|
| Exposure, secs | 1/500 | 1/500 | 1/30 | 30 |

With this programme it is possible to maintain the shortest exposure time of 1/500 sec. over the whole available aperture range, from the smallest aperture $f\,22$ to the maximum aperture $f\,2.8$. When the lighting conditions are so unfavourable that the light value 12 including the aperture value $f\,2.8$ and the time of 1/500 sec. is not reached, longer exposure times with a constant aperture value $f\,2.8$ are set. If the pointer 4 of the moving coil meter assumes a position which corresponds to the light value 8 of the light value series arranged above the slide 6, this light value will yield with the aperture $f\,2.8$ the longest exposure time on the scale, i.e. one-thirtieth sec. Worse lighting conditions may lead to exposure times which are longer than one-thirtieth sec. and therefore are no longer suitable for hand-held exposures. The scanning cam 6d' shown as a straight line gives the smoothly variable aperture-time combinations shown below:

| f No. | 22 | 2.8 | |
|---|---|---|---|
| Exposure, secs | 1/500 | 1/30 | 30 |

In this case also with the maximum lighting intensity the smallest aperture $f\,22$ can be associated with the shortest exposure time of 1/500 sec. With diminishing lighting in this case however both the aperture and the time vary, giving continuous correlations up to the aperture value $f\,2.8$ and time value of one-thirtieth sec.

Figure 8:
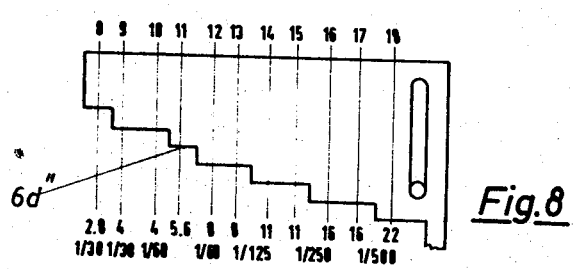
FIG. 8 is an embodiment of a scanning cam which has time values paired with aperture values.

In accordance with FIG. 8 the scanning cam 6d'' gives the following aperture-time programme:

| f No. | 22 | 16 | 16 | 11 | 11 | 8 | 8 | 5, 6 | 4 | 4 | 2.8 | |
|---|---|---|---|---|---|---|---|---|---|---|---|---|
| Exposure, secs | 1/500 | 1/250 | | 1/125 | | 1/60 | | 1/60 | 1/30 | | 1/30 | 30 sec. |

A characteristic feature of this programme is that certain time values have two aperture graduations associated with them, and vice versa.

To give the person taking photographs information concerning the prevailing lighting conditions i.e. to show him with which aperture and time an exposure is made, the pointer 4 of the moving coil meter, as shown in FIG. 3, has an indicating device associated therewith. The latter has a scale 50 corresponding to the graduations of the scanning slider 6, which scale is terminated at both ends by red warning strips 51 and 52. Between these two warning bands is a green strip 53 corresponding to the usable range of the indicating scale 50. FIG. 3 shows that the pointer 4 of the moving coil meter does not move into the range of the indicating scale 50 until a certain light intensity prevails. If the pointer remains off band 53, exposure times are always determined at aperture $f\,2.8$, such exposures being longer than one-thirtieth sec., possibly ultralong exposure times of 10, 20 or even 30 secs.

In order to permit calibration of the moving coil meter 5 before operating a camera controlled by means of the scanning and timing mechanisms referred to above, a balancing resistor or potentiometer RI and a switch $S_1$ are provided in the circuit. The switch $S_1$ is actuated by means of a test key by hand, not shown in the drawing. The test key may be mounted anywhere on the camera housing. When the test key and the switch $S_1$ are actuated, the photoelectric resistor 20 is short circuited and the pointer 4 of the moving coil meter swings out to a value corresponding to the voltage of the battery. To show the person taking photographs whether this voltage has dropped below a certain limit value, the indicating scale 50 is provided with a gauge mark 54. By means of this mark the photographer knows that the voltage of the battery is still adequate if the pointer deflects beyond, or at least to, the mark. If this is not the case, the battery 33 must be replaced.

Figure 5:
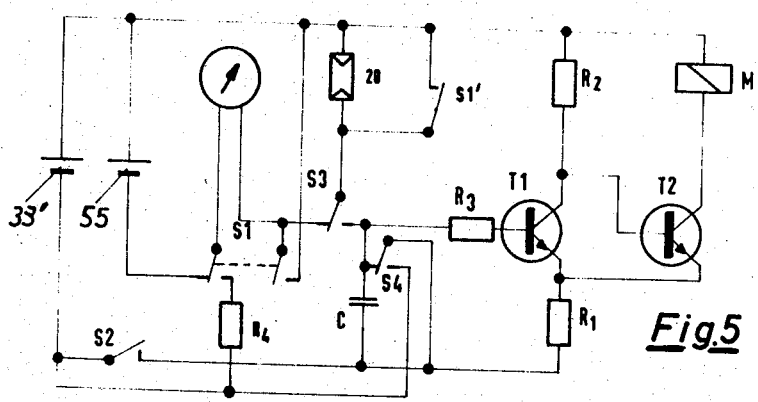
FIG. 5 is a similar schematic for an arrangement in which separate batteries are provided for the moving coil meter and the electromagnet.

Whilst the schematic shown in FIG. 4 refers to an arrangement in which only a single battery is provided for supplying the moving coil meter and the electronic circuit, FIG 5 shows a schematic in which the moving coil meter and the electronic circuit are each provided with its own battery 33' and 55. Thus a button cell may be used, for example, for the moving coil meter, whilst the supply for the electronic circuit is provided by means of a more powerful battery. Since the button cell is a mercury battery with a very small output, with a voltage which is substantially constant over its whole life, the calibration potentiometer RI may be omitted. The electronic circuit in FIG. 5 is similar to that shown in FIG. 4 except that minor deviations occur with regard to the switching circuits of the moving coil meter and to the electronic circuit arrangement, and also with regard to the test switch. In the circuit arrangement of FIG. 5 the switch $S_1$ serving to control the battery 33' is a double switch, and for the purpose of testing the button cell 55 a further switch $s_1'$ short-circuiting the photoelectric resistor may be provided. Finally, a resistor $R_4$ is provided which, when the circuit is operative, balances out the difference in voltage between the two batteries.

The method of operation of an electronic programme camera as described above is as follows:

First of all, when making an exposure, at the beginning of the release actuation the pointer 4 of the moving coil meter 5 is fixed in the position it assumes, by the clamp 8. Progressive movement of the release plunger 2 causes the scanning device for the pointer 4 to come into action. The stroke of the scanning cam 6 which, until coming to rest against the pointer 4, participates in the release movement, moves the lens diaphragm 12, 13 and the diaphragm 17, 18 simultaneously from their smallest apertures to a larger one. If the light intensity is so great that aperture $f\,22$ is used, the diaphragms 12, 13 and 17, 18 retain their original positions, since in this case the scanning cam 6 is already supported against the pointer 4 at the beginning of the scanning movement. With progressive release movement switch $S_2$ is closed and subsequently thereto the shutter is released by action of the engaging member 2b of the plunger 2 on the release lever 29. Since at this time the transistor $T_1$ is still blocked, and $T_2$ is conductive, current passes through the coil of the electromagnet M. The core of the magnet retains the armature 42 of the armature lever 40 which has already been pressed against it, so that the driving disc 26 is caught and locked by means of the catch lever 43 when the shutter blades 24 have attained the open position. Movement of the sector ring 25 during the opening procedure causes first the switch $S_3$ and directly afterwards the charge starter switch $S_4$ to be changed over. The photoelectric resistor 20 is disconnected by means of the switch $S_3$ from the moving coil meter 5 and connected both to capacitor C and the base of the transistor $T_1$.

Subsequently switch $S_4$ opens the short-circuit across the capacitor C and connects the circuit parallel to $S_2$ with the battery 33 so that the release plunger 2 may return to the starting position and the switch $S_2$ may be opened even at longer shutter times without interrupting the function of the electronic circuit. When the capacitor C has been charged via the photoelectric resistor 20 to the operating (threshold) value of the circuit, the transistor $T_1$ becomes conductive and $T_2$ is blocked. Since current can no longer pass through the coil of the electromagnet M, the armature 42 of the armature lever 40 is released, and the suppression mechanism previously acting on the sector ring 25 becomes ineffective, so that the shutter blades 24 return to the closed position. The exposure time resulting thereby is dependent upon the light intensity prevailing during exposure and the setting position of the diaphragm 17, 18 acting on the photoelectric resistor 20; the grey filter 46 also acting on the photoelectric resistance serves to take the film speed into account.

The invention is not limited to the embodiment described in detail above and shown in the drawings, but could also be used in connection with those cameras in which the photoelectric resistor required for controlling the diaphragm setting and the exposure time is located in the path of rays passing through the camera lens. This would avoid the need for an additional diaphragm for the photoelectric resistor. The moving coil meter could also cooperate with a photoelectric cell in place of a battery and a photoelectric resistor. In this case it would be necessary to take into account the result of the scanning device movement and the film speed by means of electrical elements in the electronic timing circuit.

It should be understood that the various parts of the shutter displaced during an exposure may be reset subsequently as by means of intercoupling them with the film winding mechanism in known manner.

I claim:

1. A photographic camera comprising: a photosensitive device which may be connected to a moving coil meter pointer, a clamp for said pointer, a sliding cam cooperating with said pointer, said sliding cam having a shaped profile extending over a distance which corresponds to the maximum pointer movement for hand held exposures, the shape of said profile being determined by a predetermined exposure time-diaphragm opening program, a lens diaphragm, an electronic exposure timing circuit controlled by said photosensitive device, a shutter controlled by said circuit, mechanical coupling means between said lens diaphragm and said sliding cam to set said diaphragm aperture, a further diaphragm in front of said photosensitive device, and a mechanical coupling from said further diaphragm to said lens diaphragm.

2. A photographic camera comprising: a photosensitive device which may be connected to a moving coil meter pointer, a clamp for said pointer, a sliding cam cooperating with said pointer, said pointer being provided with a scale visible to a user of said camera, said scale being calibrated in accordance with the exposure-time diaphragm opening cam program, a lens diaphragm, an electronic exposure timing circuit controlled by said photosensitive device, a shutter controlled by said circuit, coupling means between said lens diaphragm and said sliding cam to set said diaphragm aperture, a further diaphragm in front of said photosensitive device, and a mechanical coupling from said further diaphragm to said lens diaphragm.

3. A photographic camera comprising: a photosensitive device which may be connected to a moving coil meter pointer, a clamp for said pointer, a sliding cam cooperating with said pointer, a lens diaphragm, an electronic exposure timing circuit controlled by said photosensitive device, a shutter controlled by said circuit, mechanical coupling means between said lens diaphragm and said sliding cam to set said diaphragm aperture, a further diaphragm in front of said photosensitive device, and a mechanical coupling from said further diaphragm to said lens diaphragm, wherein said photosensitive device is a photosensitive resistor, with a battery and a switch connected to said resistor, said switch having a changeover contact, movement of said switch from an operating to a test position being such as to cut said resistor out of circuit with said meter and energize said meter from said battery and a gauge calibration mark near said meter point whereby the condition of said battery may be tested.

4. A photographic camera comprising: a photosensitive resistor and associated battery, a moving coil meter and pointer deflected by the current in said resistor, a clamp for said pointer, a sliding diaphragm opening - exposure time cam cooperating with said pointer, a scale over which said pointer moves, and visible to the camera user, calibrations of exposure times and lens apertures on said scale, a lens diaphragm, means interconnecting said diaphragm with said sliding cam to set said diaphragm opening, a second diaphragm coupled to said lens diaphragm and varying the light falling on said photosensitive resistor, a grey wedge located behind said second diaphragm said wedge having density graduations corresponding to a range of film speeds, a release plunger, a shutter released by said plunger, a variable electronic timing circuit for said shutter, and switch means to switch said photosensitive resistor from said meter circuit to said electronic circuit to control the time between the opening and the closing of said shutter.

5. A photographic camera as recited in claim 4 wherein said electronic circuit has an electromagnet acting to hold said shutter open for a time determined by said electronic circuit, there being a first battery to actuate said meter pointer and a second battery to energize said electronic circuit.

6. A photographic camera as recited in claim 4 having contacts for actuating said electronic timing circuit, an actuating mechanism for the blades of said shutter, and means whereby said actuating mechanism also actuates said contacts.

7. A photographic camera having an electronic timing device controlled by a photoelectric resistor, characterized by a combination of the following features:

a. the photoelectric resistor (20) and a battery (33) are connected to a moving coil meter (5) the pointer of (4) which has an indicating scale (50);

b. the pointer has a clamp member;

c. there is a sliding cam (6—10) which while the shutter release is actuated and the pointer is clamped moves to a point determined by the pointer, simultaneously setting the lens diaphragm (12, 13) and a regulating device (17, 18) affecting the light falling on the photoelectric resistor and hence the timing of the electronic timing device;

d. the sliding cam has a shaped profile cooperating with the meter pointer, provided with a curved surface (6d, 6d', 6d'') extending over a distance which corresponds to the sum of the diaphragm aperture range and the exposure time range of the shutter from the shortest to a predetermined maximum of e.g. one-thirtieth second;

e. the characteristic of the surface is formed to give a predetermined diaphragm setting-exposure time programme.

8. A photographic camera as recited in claim 7 wherein said regulating device comprises a resistor varied by action of said cam, said resistor affecting the trigger voltage of said electronic timing circuit.

9. A photographic camera as recited in claim 7 provided with a release plunger, with interconnecting means between said plunger, said sliding cam and said shutter mechanism whereby movement of said plunger to initate an exposure causes said cam to perform a sliding movement limited by said pointer followed by release of said shutter mechanism to open said shutter blades.

10. A photographic camera as recited in claim 7, having preset means for compensating for film speed, said means affecting the light falling on said photoelectric device.

11. A photographic camera as recited in claim 7 comprising film sensitivity compensating means which varies a resistor in said electronic circuit, said resistor affecting the threshold voltage of said electronic circuit.

12. A photographic camera as recited in claim 7 further including an exposure timing circuit comprising an energizing battery, a capacitor and a charging circuit therefor, means for varying said charge circuit rate in accordance with the ambient lighting conditions, a pair of transistors a first one connected to said capacitor and a second one to a shutter locking electromagnet, and interconnections to said transistors whereby said first transistor becomes conductive at a predetermined voltage and said second transistor becomes blocked thus releasing said electromagnet.